United States Patent [19]
Fukushima

[11] Patent Number: 4,948,929
[45] Date of Patent: Aug. 14, 1990

[54] IMPULSE SENSOR

[75] Inventor: Hiroshi Fukushima, Fujisawa, Japan

[73] Assignee: Nippon Seiko Kabushiki Kaisha, Tokyo, Japan

[21] Appl. No.: 404,858

[22] Filed: Sep. 8, 1989

[30] Foreign Application Priority Data

Sep. 14, 1988 [JP] Japan .................. 63-228566

[51] Int. Cl.$^5$ .......................................... H01H 35/14
[52] U.S. Cl. ........................... 200/61.45 M; 200/61.53
[58] Field of Search ............... 200/61.45 R, 61.45 M, 200/61.52, 61.53; 335/205; 73/516 R, 517 R

[56] References Cited

U.S. PATENT DOCUMENTS

| | | | |
|---|---|---|---|
| 2,997,557 | 8/1961 | Gillmor et al. | 200/61.45 R |
| 4,043,076 | 8/1977 | Potrzuski et al. | 200/61.52 |
| 4,329,549 | 5/1982 | Breed | 200/61.45 M |
| 4,450,326 | 5/1984 | Ledger | 200/61.45 M |
| 4,843,877 | 7/1989 | Kushida et al. | 73/516 R X |

FOREIGN PATENT DOCUMENTS 60-233564 11/1985 Japan .

Primary Examiner—J. R. Scott
Attorney, Agent, or Firm—Basile and Hanlon

[57] ABSTRACT

A weight of an electrically conductive material is held floating in a magnetic fluid sealed in a case body. A pair of contacts are provided at one end of the case body in a travelling direction of an automobile and protrude into the inside of the case body. Permanent magnets are provided at opposite ends of the case body to apply magnetic fields to the magnetic fluid so that in a normal travelling condition of the automobile, the weight is prevented from reaching the pair of contacts even when the automobile is accelerated or decelerated. However, when an impulsive force exceeding a predetermined level is exerted on the impulse sensor due to collision of the automobile with another automobile or an obstacle, the weight is moved by an inertia force and reaches the pair of contacts to generate a contact signal.

3 Claims, 2 Drawing Sheets

IMPULSE SENSOR

BACKGROUND OF THE INVENTION

1. Field of the Invention

The present invention relates to an impulse sensor for sensing an inpulsive force when an impulsive force not less than a predetermined value is transmitted and, in particular, to an impulse sensor suitable for operating an air bag of an automobile.

2. Description of the Prior Art

A first example of a known prior art impulse sensor is shown in FIG. 6.

This first prior art impulse sensor, as shown in FIG. 6, comprises a weight 23 held in a case body 21 attracted by a magnet 22 disposed at one side of the case body 21, a cylindrical guide 24 for guiding the weight 23 and having an inner diameter slightly larger than a diameter of the weight 23, and a pair of contacts 25a and 25b provided on an inner surface of the other side of the case body 21 opposing the cylindrical guide 24.

When the impulse sensor is mounted on an automobile, normally, the weight 23 is attracted to and held by the magnet 22 so that the pair of contacts 25a and 25b are in a non-conductive condition. When the automobile stops suddenly from the normal moving condition, the weight 23 is caused to move to the left (in FIG. 6) due to an inertia force of the weight 23. At this time, the air in the case body 21 must pass through gaps between the inner surface of the cylindrical guide 24 and the outer surface of the weight 23. However, the weight 23 is prevented from reaching the pair of contacts 25a and 25b due to the viscosity of the air. On the other hand, when the automobile stops suddenly due to a collision, the weight 23 is pulled to the left by a velocity difference and by deceleration. Thus, when the impulsive force is sustained for a certain time period, the weight 23 overcomes the viscosity force of the air and reaches the pair of contacts 25a and 25b to render them conductive. As a result, a switch signal can be obtained.

Furthermore, a second prior art example of an acceleration sensor is disclosed in Japanese Patent Lain-Open publication No. 60-233564.

In this acceleration sensor, a magnetic fluid and a medium which is not mixed with the magnetic fluid and which has a specific gravity different from that of the magnetic fluid are sealed in a case, and a constant magnetism generating means is provided to apply a constant magnetic field to the magnetic fluid to form the magnetic fluid in a cylindrical shape. Moreover, detecting means for detecting a position of the magnetic fluid is provided to detect acceleration by detecting a position of movement of the magnetic fluid which is moved in accordance with the acceleration.

However, in the first prior art example, problems are encountered in that since it is designed to prevent an erroneous movement of the weight by utilizing the viscosity of air which passes through the gaps between the weight 23 and the cylindrical guide 24, a high accuracy is required in the sphericity of the weight 23, the cylindricity of the cylindrical guide 24, and the size tolerance between the weight 23 and the cylindrical guide 24. As a result, the machining of the parts is difficult. In addition, since gold plating for rust prevention is required to be applied to the weight 23 to avoid unsatisfactory movement of the weight 23 due to rust caused by the air in contact therewith, the working cost of the sensor is increased.

In the second prior art example, since it is arranged that the impulsive force is transmitted to the magnetic fluid through the medium in order to detect acceleration by the movement of the magnetic fluid, the response of the sensor is degraded. As a result, there is an unsolved problem in that the above-mentioned sensor can not be used as an impulse sensor which is required to be highly responsive so as to be instantly operated upon collision of the automobile to actuate an air bag.

SUMMARY OF THE INVENTION

The present invention was made in view of the unsolved problems in the above-mentioned prior art examples, and it is an object of the invention to provide an impulse sensor capable of detecting an impulsive force with a simple structure and with a high response when an impulsive force not less than a predetermined value is exerted.

In order to solve the above-mentioned unsolved problems, in the present invention, an impulse sensor for detecting an impulsive force when the impulsive force not less than a predetermined value is transmitted thereto comprises an electrically conductive weight movably held in a case body by a inertia force applied thereto, a pair of contacts spaced from each other and disposed at a position opposing the weight, an electrically non-conductive magnetic fluid interposed between the pair of contacts and the weight, and a magnet for exerting a magnetic force to the magnetic fluid. In this case, the magnetic fluid may be sealed in the case body to hold the weight floating therein, or the pair of contacts may be formed by a magnetic material to have a magnet interposed between the pair of contacts so that the weight is allowed to move only when an impulsive force not less than a predetermined value is exerted on the weight due to the concentration of the magnetic fluid by a magnetic force of the magnet.

In the impulse sensor in the present invention, in a normal condition, movement of the weight is suppressed by the concentration of the magnetic fluid due to the magnetic force of the magnet, and the pair of contacts are maintained in a non-conductive state. In this condition, when an impulsive force of not less than a predetermined value is exerted due to a velocity difference and deceleration, the weight is moved to the position of the pair of contacts due to an inertia force against the magnetic fluid. As a result, the pair of contacts are brought into a conductive condition by the weight, and an impulse detection signal can be obtained.

DESCRIPTION OF THE PREFERRED EMBODIMENTS

Figure 1:
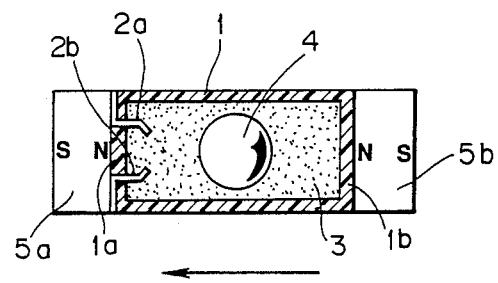
FIG. 1 is a longitudinal sectional view illustrating a first embodiment of the present invention.

FIG. 1 shows in cross section a first embodiment of the present invention.

A case body 1 of a cylindrical shape is made of a non-magnetic and non-conductive material, such as a synthetic resin, and opposite ends are closed by end plates 1a and 1b, respectively. The end plate 1a is provided with a pair of contacts 2a and 2b which protrude into the interior of the case body 1 in a sealed manner with a sealing member.

The case body 1 is filled with a magnetic fluid 3 having a non-conductive property, and a conductive and non-magnetic weight 4 made of copper, silver, or the like and having a spherical shape is held floating in the magnetic fluid 3. Here, the magnetic fluid 3 in a liquid of a colloidal state in which ferromagnetic particles $Fe_3O_4$ having a diameter of 100 Å are dispersed with a high concentration in a solvent of a silicone oil or the like. No sedimentation and coalescence of the magnetic particles occur in the magnetic fluid 3, and the magnetic fluid 3 behaves as if the liquid itself has a magnetic property.

Permanent magnets 5a and 5b are disposed on the outside of the end plates 1a and 1b of the case body 1 respectively to exert magnetic forces on the magnetic fluid 3. The permanent magnets 5a and 5b are formed in a disk shape and magnetized so that a N-pole appears at the side of the case body 1 and a S-pole appears at the opposite side of the case body 1.

Next, the operation of the first embodiment will be described. First, the impulse sensor structured as described above is mounted on an automobile so that its right-left direction, or its longitudinal direction, is coincident with a travelling direction of the automobile, and further, the pair of contacts 1a and 1b are positioned at the front side of the automobile.

In this mounting condition of the impulse sensor on the automobile, when the automobile is stopped, no force is exerted on the impulse sensor. Accordingly, the magnetic fluid 3 in the case body 1 is gathered from a center portion by the magnetic forces of the permanent magnets 5a and 5b at positions near the end plates 1a and 1b, and the weight 4 is held floating in the magnetic fluid 3 at the center portion of the case body 1. As a result, although the magnetic fluid 3 is present between the pair of contacts 2a and 2b, since the magnetic fluid 3 is non-conductive, the contacts 2a and 2b are maintained in a non-conductive state and no contact signal is generated from the contacts 2a and 2b.

In this condition, when the automobile is started and accelerated, the weight 4 is urged to move towards the rear end of the automobile, that is, to the right side in FIG. 1 due to an inertia force by the acceleration and a velocity difference at this time. However, the movement of the weight 4 is suppressed by the presence of the magnetic fluid 3.

In this travelling condition of the automobile, when the brake pedal is depressed to decelerate the automobile, the weight 4 is urged to move towards the front end of the automobile, that is, towards the pair of contacts 2a and 2b at the left side in FIG. 1 due to an inertia force corresponding to the deceleration and a velocity difference. However, since the deceleration and the velocity difference are not so great, the movement of the weight 4 is suppressed by the presence of the magnetic fluid 3 and the weight 4 never reaches the pair of contacts 2a and 2b.

However, when the automobile collides with another automobile or an obstacle while travelling forwardly, a great impulsive force is exerted on the impulse sensor, and an inertia force corresponding to deceleration and velocity difference is exerted on the weight 4. As a result, the magnetic fluid 3 is moved instantly to the left side in FIG. 1 against the viscosity of the magnetic fluid 3, and the weight 4 collides with the pair of contacts 2a and 2b to make the contacts 2a and 2b conductive. Thus, a contact signal representing the collision state is generated.

Accordingly, by supplying this contact signal to an ignition device of a fuse of an air bag, it is possible to actuate the air bag instantly to thereby prevent the face of a passenger from colliding with a steering wheel or a glass window.

While the two permanent magnets 5a and 5b are provided in the first embodiment, only the permanent magnet 5a may be provided at the side of the contacts 2a and 2b by omitting the permanent magnet 5b.

Figure 2:
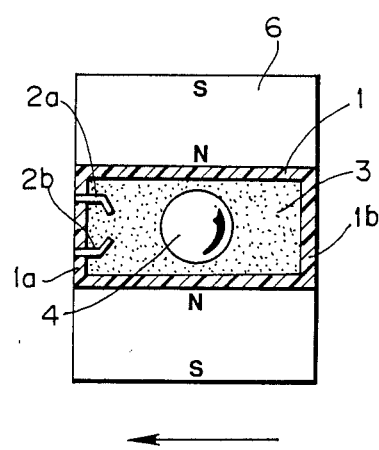
FIGS. 2 and 3 are respectively longitudinal sectional views showing modifications of the first embodiment.

Furthermore, in the first embodiment, although the permanent magnets 5a and 5b are provided on both of the end plates 1a and 1b of the case body 1, the present invention is not limited to this and, as shown in FIG. 2, a cylindrical hollow permanent magnet 6, or a plurality of permanent magnetic pieces 6 formed by dividing a cylindrical hollow magnet by a plane or planes extending in an axial direction, may be provided on a cylindrical peripheral outer surface of the case body 1. Furthermore, a half of the case body 1 at the side of the contacts 2a and 2b may be formed in a truncated cone (not shown) having an increasing diameter towards the contacts 2a and 2b so as to provide a gradient in the magnetic flux density of the permanent magnet 6. In this case, the characteristics of the magnetic fluid become non-linear and the response of the sensor can be increased.

Figure 3:
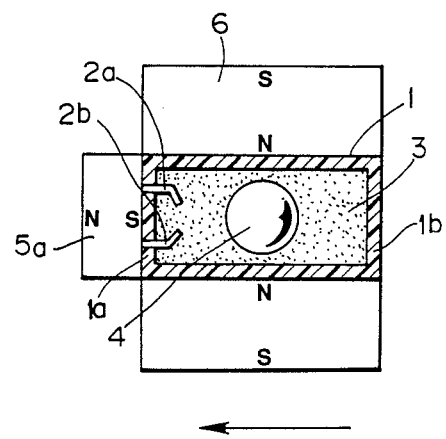

Furthermore, as shown in FIG. 3, a permanent magnet 5a in the first embodiment may be added to the structure of FIG. 2.

Furthermore, the shape of the case body 1 is not limited to a cylindrical shape, and any desired hollow shape, such as a square hollow shape, may be used.

Next, a second embodiment of the invention will be described with reference to FIG. 4.

In the second embodiment, instead of holding the weight 4 floating in the magnetic fluid 3, a magnetic fluid is interposed between a pair of contacts and a weight.

Figure 4:
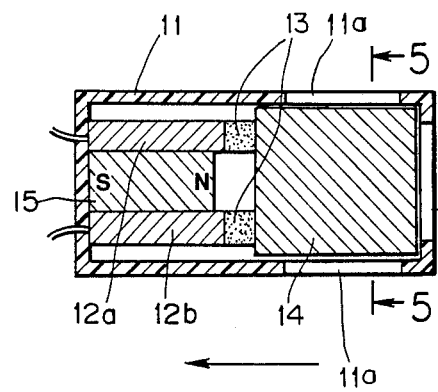
FIG. 4 is a longitudinal sectional view of a second embodiment of the invention.

Specifically, as shown in FIG. 4, a weight 14 of a rectangular parallelpiped shape is slidably disposed in an axial direction at a right side portion in a case body 11 having a square, hollow shape. A pair of contacts 12a and 12b made of a magnetic material are disposed at a left side portion in the case body 11 at positions opposing the weight 14 and are spaced from each other in the vertical direction. A permanent magnet 15 having a S-pole at the left end side and a N-pole at the right end side is disposed between the contacts 12a and 12b. A predetermined amount of magnetic fluid 13 having a non-conductive property is attracted to and held by the magnetic force of the permanent magnet 13.

Figure 5:
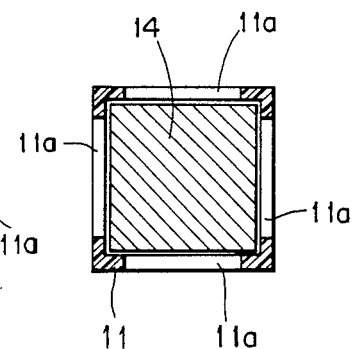
FIG. 5 is a sectional view taken along the line 5—5 in FIG. 4.
Figure 6:
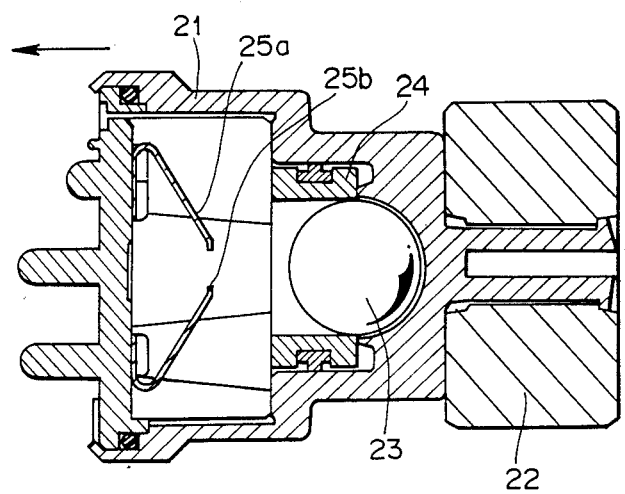
FIG. 6 is a longitudinal sectional view showing a prior art example of an impulse sensor.

As shown in FIG. 5, air passage windows 11a are formed in the peripheral wall of the case body 11 at positions facing the weight 14 so that no negative pressure is generated when the weight 14 is moved.

In the second embodiment, similar to the first embodiment, when no impulsive force is exerted on the impulse sensor, the contacts 12a and 12b and the weight 14 are insulated from each other by the magnetic fluid 13 which has a non-conductive property, and the contacts 12a and 12b are non-conductive. From this condition, when an impulsive force not less than a predetermined value, that is, exceeding a force for holding the magnetic fluid 13 is exerted, the weight 14 is moved in a left direction by an inertia force and collides with the contacts 12a and 12b by excluding the magnetic fluid 13 therebetween to make the contacts 12a and 12b conductive. As a result, a contact signal is generated.

Accordingly, also in the second embodiment, a similar effect and advantage is obtained as in the first embodiment and, in addition, the amount of magnetic fluid used is small as compared with the first embodiment.

In the second embodiment, it is preferable that the inner peripheral surface of the case body 11 disposed in sliding contact with the weight 14 be coated with a coating material, such as a polytetrafluoroethylene (PTFE), polyoxymethylene (POM), or the like. Alternately, the case body 11 itself can be made of PTFE, POM, or the like to improve the sliding property thereof to insure a smooth movement of the weight 14.

While the case body 11 is formed in the square hollow shape in the second embodiment, it is not limited to this shape, and any desired shape including a cylindrical shape, a polygonal hollow shape, etc., may be used.

Furthermore, in the above embodiments, an electromagnet may be used instead of the permanent magnet.

In the present invention, as described in the foregoing, an impulse sensor is arranged so that a weight is slidably disposed in a case body opposing a pair of contacts, a magnetic fluid is interposed between the weight and the contacts and exhibits a viscosity by a magnet. Therefore, the over-all structure becomes simple, and the manufacturing cost can be reduced since no high accuracy in size is required for the case body and weight. Moreover, since the impulsive force is detected by utilizing an inertia force of the weight, quick response can be insured for an impulsive force not less than a predetermined value. Another advantage is that the force for holding the magnetic fluid can be adjusted as desired by changing the magnetic force of the magnet.

In addition, an advantage is provided in that since the weight is held in a floating position in the magnetic fluid, there is no need to take into consideration any frictional resistance between the weight and the case body or a guiding member at the time of movement of the weight. It is also possible to prevent rust due to oxidation of the weight.

Furthermore, when a magnetic fluid is attracted and held at the end surfaces of the pair of contacts facing the weight, an advantage is obtained in that the amount of magnetic fluid to be used is reduced so that the producing cost can also be reduced.

I claim:

1. An impulse sensor for detecting an impulsive force when the impulsive force not less than a predetermined value is transmitted thereto, comprising:
    a weight having an electrically conductive property and slidably held in a case body by an inertia force;
    a pair of contacts spaced from each other and disposed in said case body at a position opposing said weight in a direction of movement of said weight;
    a magnetic fluid having a non-electrically conductive property and interposed between said pair of contacts and said weight; and
    a magnet for exerting a magnetic force to said magnetic fluid.

2. The impulse sensor according to claim 1 wherein said magnetic fluid is sealed in said case body to hold said weight floating therein.

3. The impulse sensor according to claim 1 wherein said magnet is interposed between said pair of contacts and said magnetic fluid is attracted to and held at end surfaces of said pair of contacts facing said weight by said magnet.

* * * * *